(12) United States Patent
Eguchi

(10) Patent No.: US 7,777,965 B2
(45) Date of Patent: Aug. 17, 2010

(54) ZOOM LENS SYSTEM

(75) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 26 days.

(21) Appl. No.: 12/185,213

(22) Filed: Aug. 4, 2008

(65) Prior Publication Data

US 2009/0034090 A1 Feb. 5, 2009

(30) Foreign Application Priority Data

Aug. 3, 2007 (JP) ............................. 2007-202607

(51) Int. Cl.
G02B 15/14 (2006.01)
(52) U.S. Cl. ....................................... 359/682; 359/689
(58) Field of Classification Search ................. 359/680, 359/682, 689, 686; 348/240.99–240.3, 335–369; 396/72–88
See application file for complete search history.

(56) References Cited

U.S. PATENT DOCUMENTS

| | | |
|---|---|---|
| 2003/0043474 A1 | 3/2003 | Minefuji |
| 2005/0036209 A1 | 2/2005 | Iwasawa et al. |
| 2005/0046959 A1 | 3/2005 | Katakura et al. |
| 2005/0057817 A1 | 3/2005 | Ori |
| 2006/0262423 A1 | 11/2006 | Kiyotoshi |
| 2007/0139787 A1 * | 6/2007 | Kim ........................... 359/680 |
| 2007/0188888 A1 | 8/2007 | Saori |
| 2007/0263295 A1 | 11/2007 | Enomoto |
| 2008/0043342 A1 | 2/2008 | Yamamoto et al. |
| 2008/0144190 A1 | 6/2008 | Saori |
| 2008/0158690 A1 | 7/2008 | Eguchi |

FOREIGN PATENT DOCUMENTS

| | | |
|---|---|---|
| JP | 2002-277740 | 9/2002 |
| JP | 2005-37727 | 2/2005 |
| JP | 2005-70696 | 3/2005 |
| JP | 2005-70697 | 3/2005 |
| JP | 2005-84597 | 3/2005 |
| JP | 2006-301154 | 11/2006 |

OTHER PUBLICATIONS

English language Abstract of JP 2002-277740, Sep. 25, 2002.
English language Abstract of JP 2005-37727, Feb. 10, 2005.
English language Abstract of JP 2005-70696, Mar. 17, 2005.
English language Abstract of JP 2005-70697, Mar. 17, 2005.
English language Abstract of JP 2005-84597, Mar. 31, 2005.
English language Abstract of JP 2006-301154, Nov. 2, 2006.
U.S. Appl. No. 12/185,215 to Eguchi, which was filed Aug. 4, 2008.

* cited by examiner

*Primary Examiner*—Darryl J Collins
(74) *Attorney, Agent, or Firm*—Greenblum & Bernstein P.L.C.

(57) ABSTRACT

A zoom lens system includes a negative first lens group, a positive second lens group, and a positive third lens group, in this order from the object. Upon zooming from the short focal length extremity to the long focal length extremity, the distance between the negative first lens group and the positive second lens group decreases, and the distance between the positive second lens group and the positive third lens group increases. The negative first lens group includes a negative first lens element, a positive or negative lens element having a weaker refractive power, and a positive third lens element, in this order from the object. The zoom lens system satisfied the following condition:

$$-0.25 < f1/fp < 0.25 (f1 < 0) \qquad (1)$$

wherein
f1 designates the focal length of the negative first lens group; and
fp designates the focal length of the positive second lens element.

17 Claims, 11 Drawing Sheets

Fig. 1
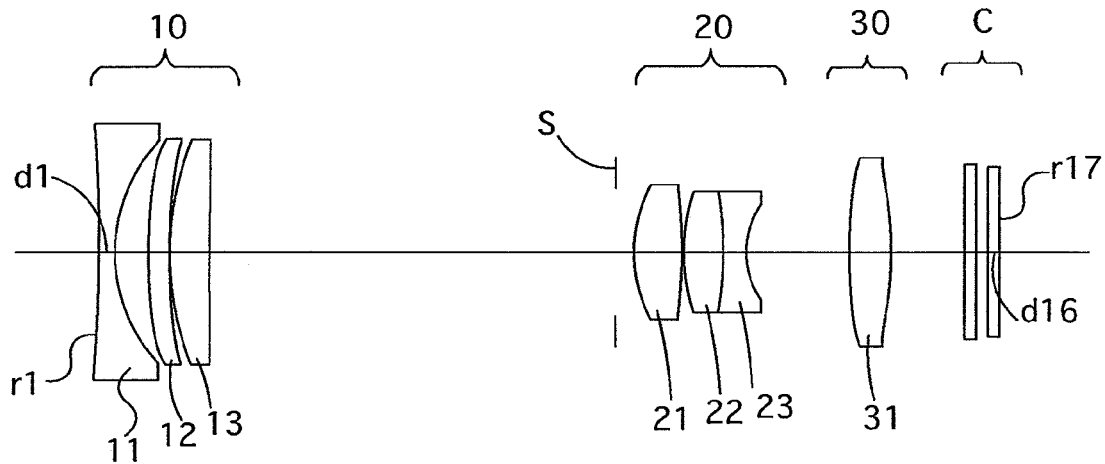
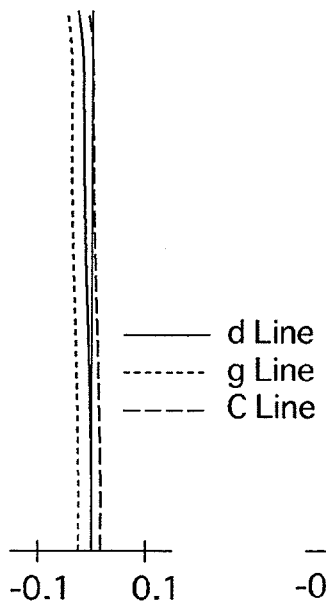
Fig. 2A
FNO.= 1 : 2.6
— d Line
······ g Line
– – C Line
-0.1    0.1
SPHERICAL
ABERRATION
CHROMATIC
ABERRATION
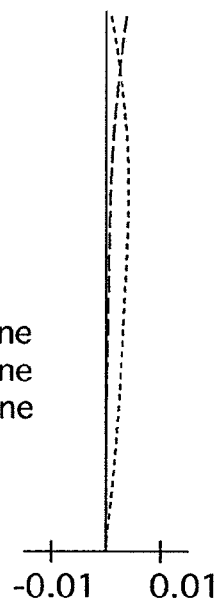
Fig. 2B
W = 31.4°
-0.01    0.01
LATERAL
CHROMATIC
ABERRATION
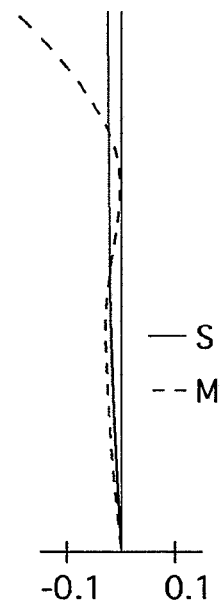
Fig. 2C
W = 31.4°
— S
– – M
-0.1    0.1
ASTIGMATISM
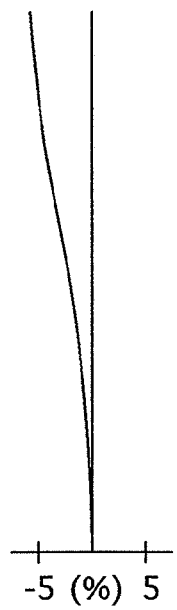
Fig. 2D
W = 31.4°
-5 (%) 5
DISTORTION

FNO.= 1 : 3.8

—— d Line
------ g Line
---- C Line

-0.1   0.1
SPHERICAL
ABERRATION
CHROMATIC
ABERRATION

W = 17.0°

-0.01   0.01
LATERAL
CHROMATIC
ABERRATION

W = 17.0°

—— S
-- M

-0.1   0.1
ASTIGMATISM

W = 17.0°

-5 (%) 5
DISTORTION

FNO.= 1 : 6.2

—— d Line
------ g Line
---- C Line

-0.1   0.1
SPHERICAL
ABERRATION
CHROMATIC
ABERRATION

W = 8.3°

-0.01   0.01
LATERAL
CHROMATIC
ABERRATION

W = 8.3°

—— S
-- M

-0.1   0.1
ASTIGMATISM

W = 8.3°

-5 (%) 5
DISTORTION

Fig. 5
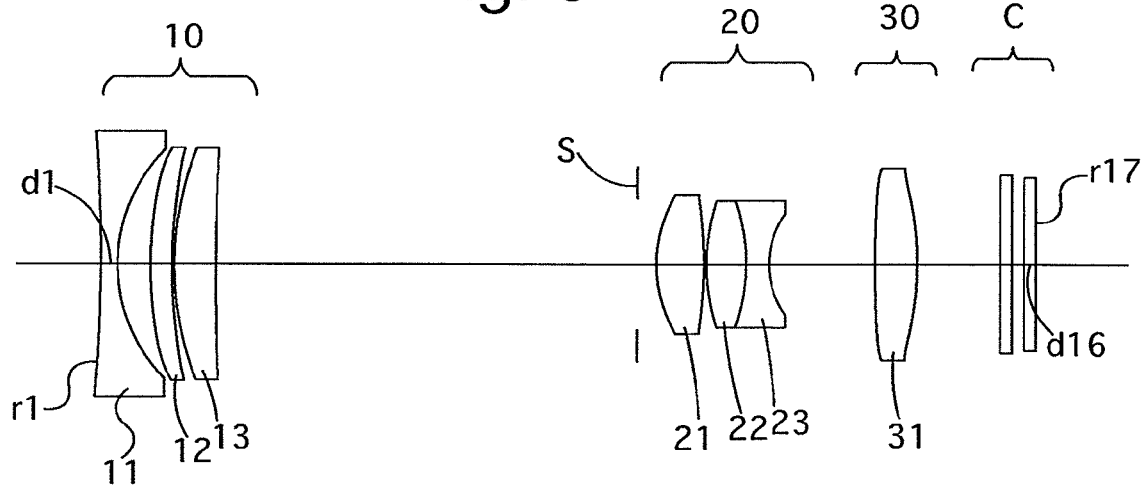
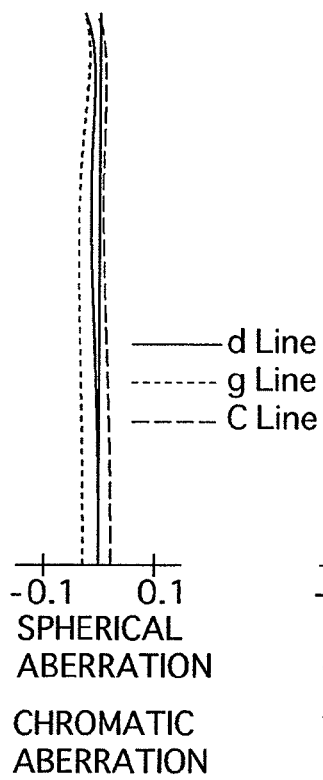
Fig. 6A
FNO.= 1 : 2.6
— d Line
---- g Line
--- C Line
-0.1   0.1
SPHERICAL
ABERRATION
CHROMATIC
ABERRATION
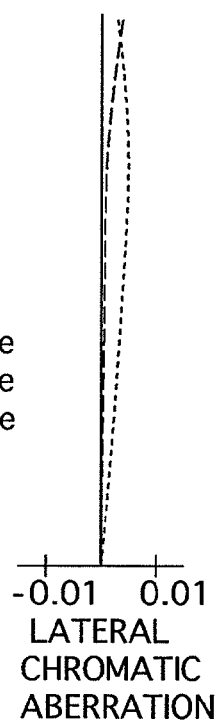
Fig. 6B
W = 30.8°
-0.01  0.01
LATERAL
CHROMATIC
ABERRATION
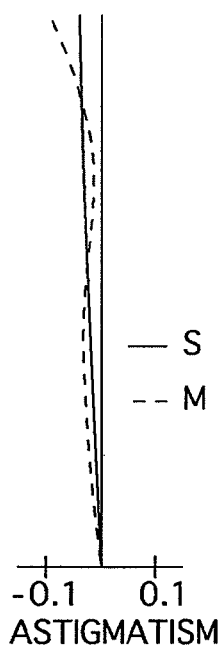
Fig. 6C
W = 30.8°
— S
-- M
-0.1   0.1
ASTIGMATISM
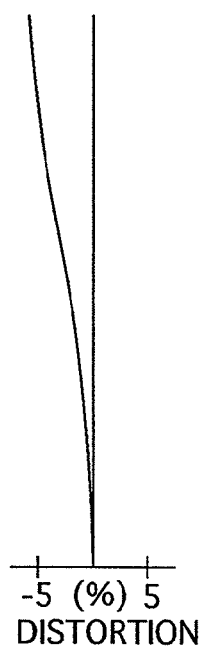
Fig. 6D
W = 30.8°
-5 (%) 5
DISTORTION Fig. 7A
FNO.= 1 : 3.8
Fig. 7B
W = 17.1°
Fig. 7C
W = 17.1°
Fig. 7D
W = 17.1°
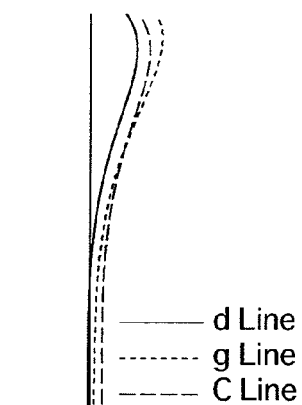
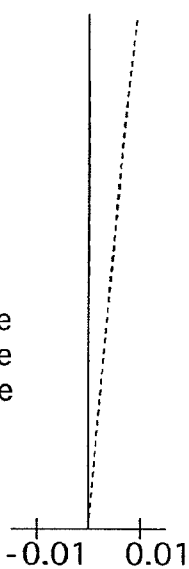
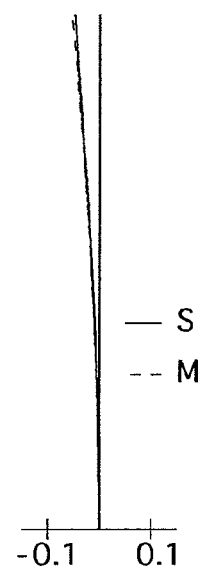
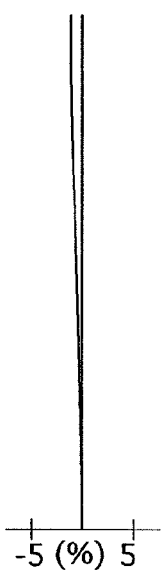
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-5 (%) 5
DISTORTION
Fig. 8A
FNO.= 1 : 6.3
Fig. 8B
W = 7.9°
Fig. 8C
W = 7.9°
Fig. 8D
W = 7.9°
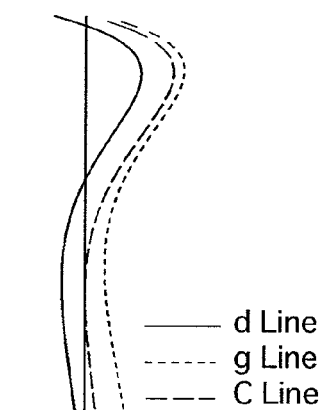
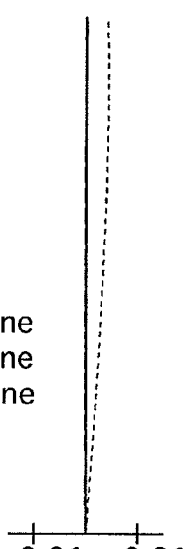
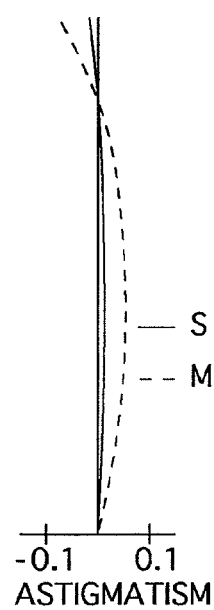
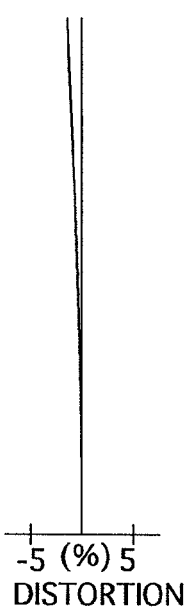
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-5 (%) 5
DISTORTION

FNO.= 1 : 2.6

W = 31.4°

W = 31.4°

W = 31.4°

——— d Line
------- g Line
---- C Line

——— S
--- M

-0.2  0.2
SPHERICAL
ABERRATION
CHROMATIC
ABERRATION

-0.01  0.01
LATERAL
CHROMATIC
ABERRATION

-0.1  0.1
ASTIGMATISM

-10 (%) 10
DISTORTION

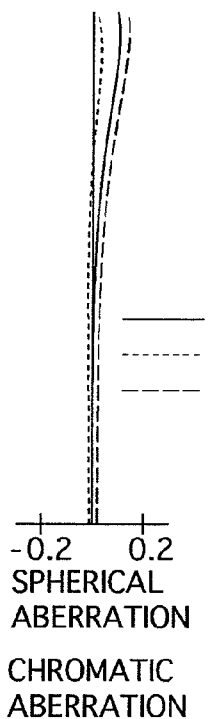
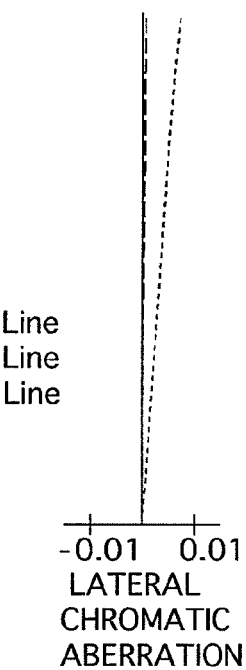
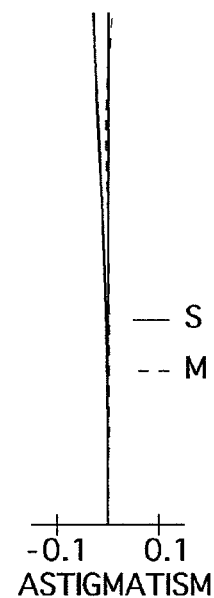
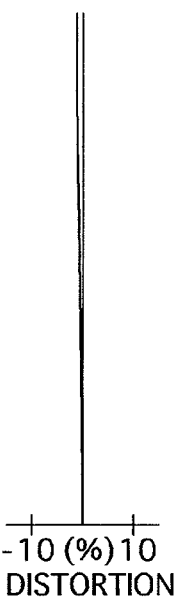
Fig. 11A FNO.= 1 : 3.8
Fig. 11B W = 17.0°
Fig. 11C W = 17.0°
Fig. 11D W = 17.0°
—— d Line
------ g Line
---- C Line
— S
-- M
-0.2  0.2
SPHERICAL ABERRATION
CHROMATIC ABERRATION
-0.01  0.01
LATERAL CHROMATIC ABERRATION
-0.1  0.1
ASTIGMATISM
-10 (%) 10
DISTORTION
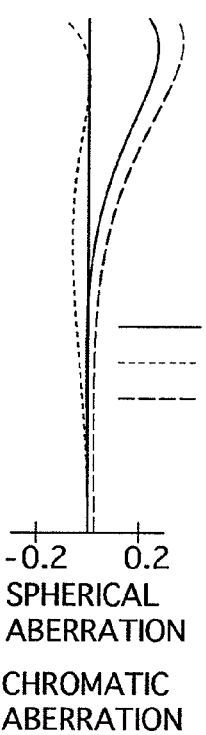
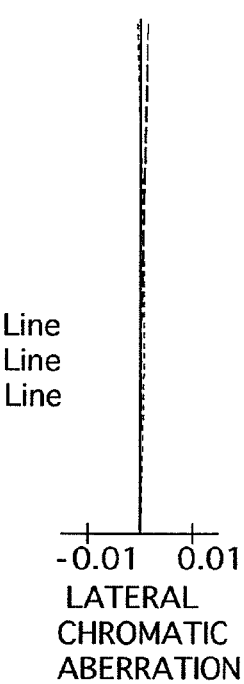
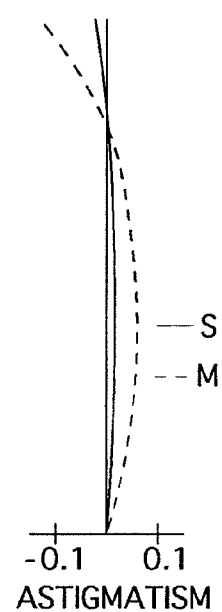
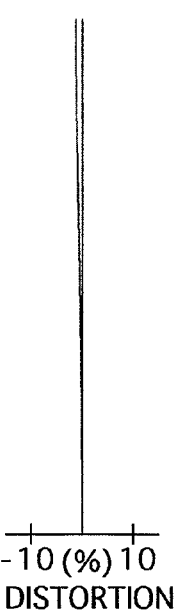
Fig. 12A FNO.= 1 : 6.2
Fig. 12B W = 8.3°
Fig. 12C W = 8.3°
Fig. 12D W = 8.3°
—— d Line
------ g Line
---- C Line
— S
-- M
-0.2  0.2
SPHERICAL ABERRATION
CHROMATIC ABERRATION
-0.01  0.01
LATERAL CHROMATIC ABERRATION
-0.1  0.1
ASTIGMATISM
-10 (%) 10
DISTORTION

Fig. 13
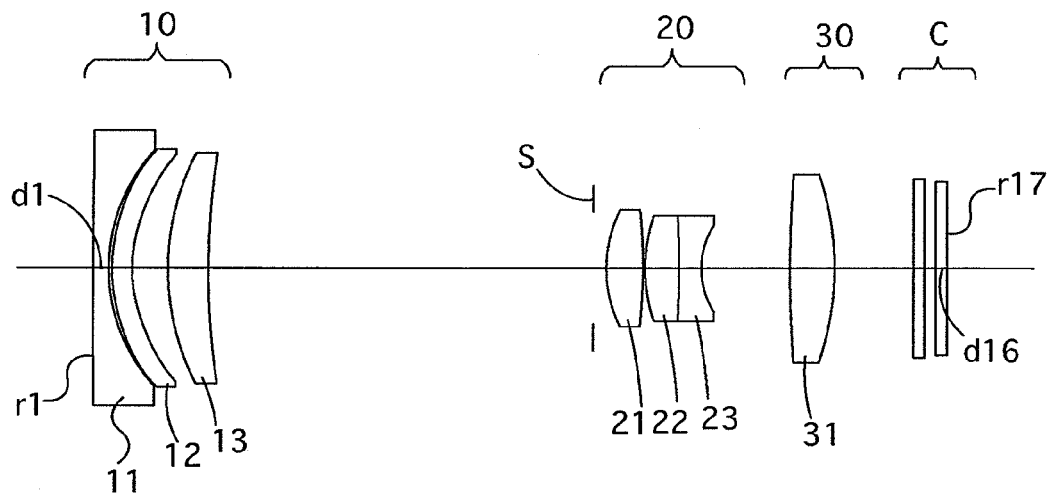
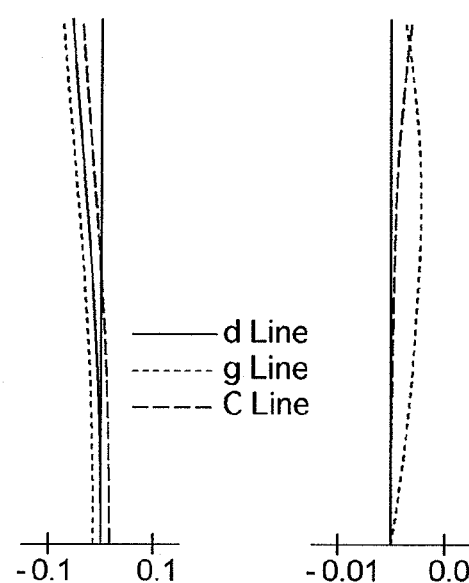
Fig. 14A
FNO.= 1 : 2.8
SPHERICAL ABERRATION
CHROMATIC ABERRATION
— d Line
---- g Line
— - C Line
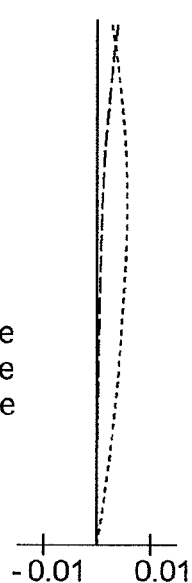
Fig. 14B
W = 32.5°
LATERAL CHROMATIC ABERRATION
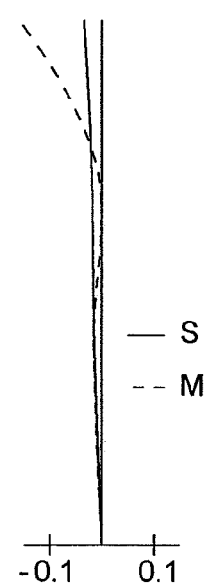
Fig. 14C
W = 32.5°
ASTIGMATISM
— S
-- M
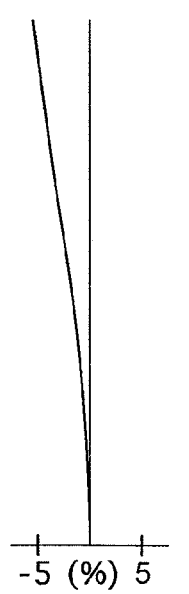
Fig. 14D
W = 32.5°
DISTORTION

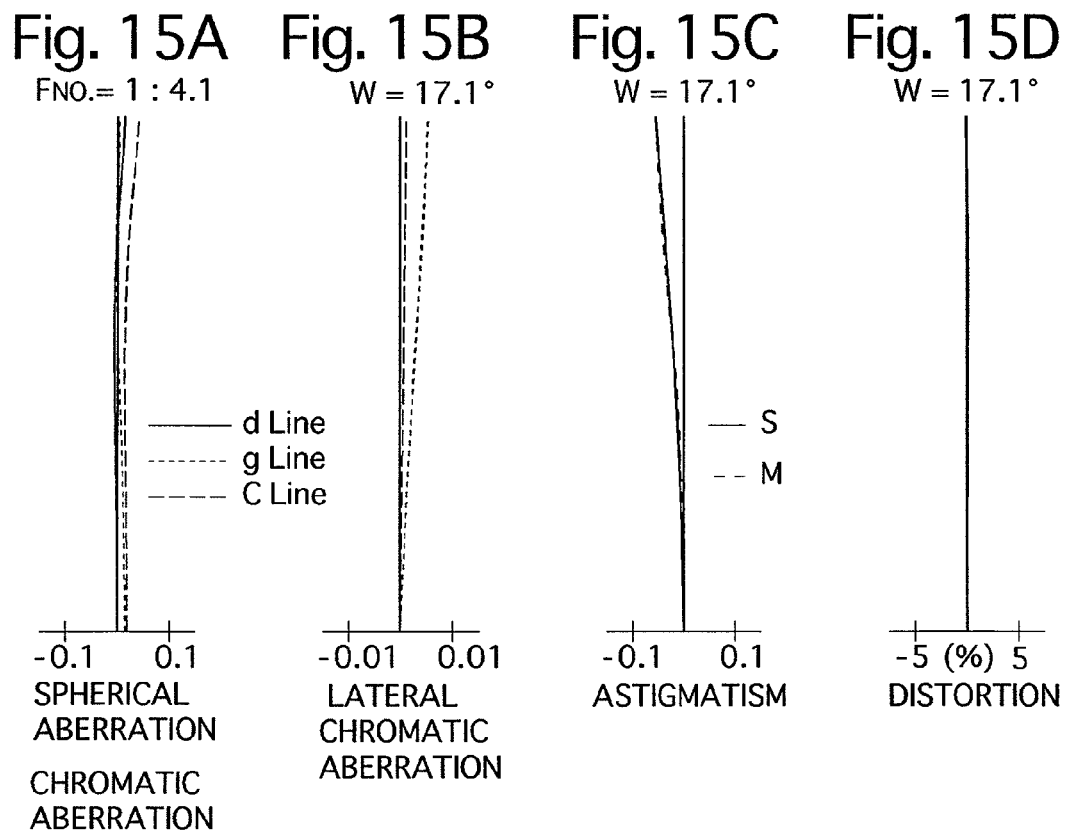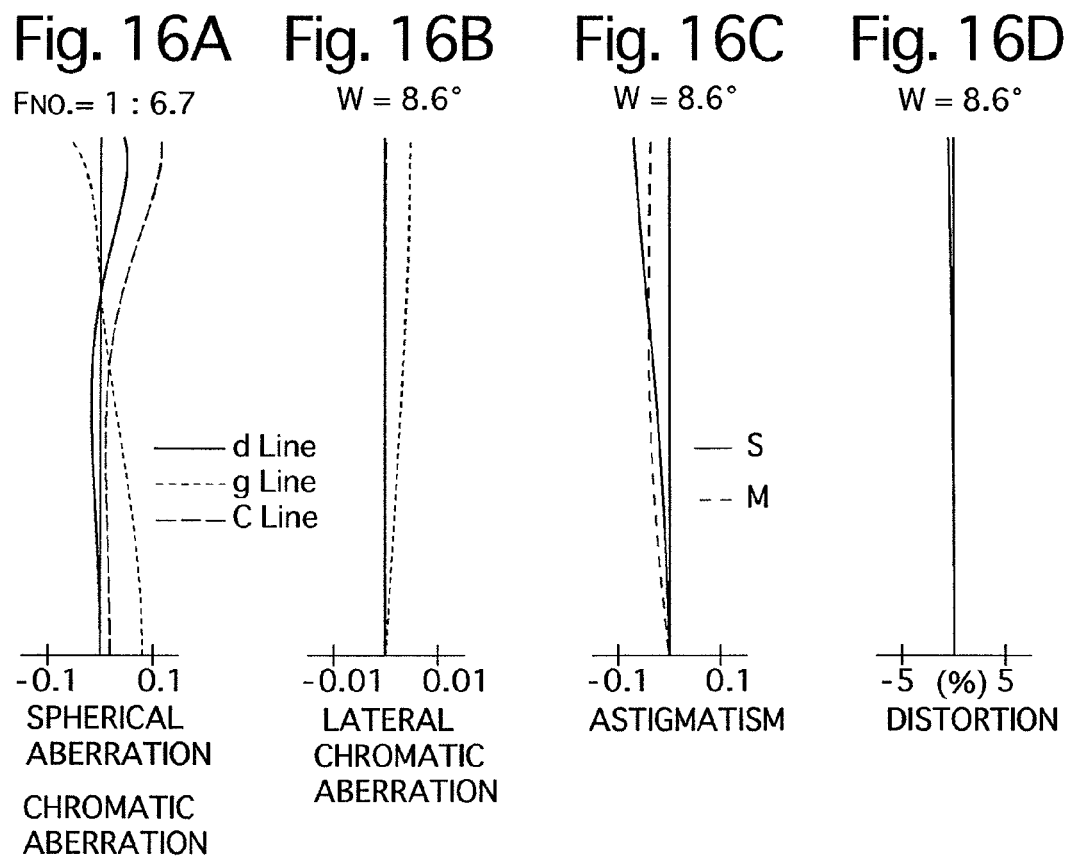

FNO.= 1 : 2.5

-0.1   0.1
SPHERICAL
ABERRATION
CHROMATIC
ABERRATION

— d Line
······ g Line
--- C Line

W = 31.5°

-0.01   0.01
LATERAL
CHROMATIC
ABERRATION

W = 31.5°

-0.1   0.1
ASTIGMATISM

— S
-- M

W = 31.5°

-5 (%) 5
DISTORTION

FNO.= 1 : 3.6 d Line
g Line
C Line

-0.1  0.1
SPHERICAL
ABERRATION
CHROMATIC
ABERRATION

W = 16.6°

-0.01  0.01
LATERAL
CHROMATIC
ABERRATION

W = 16.6°

S
M

-0.1  0.1
ASTIGMATISM

W = 16.6°

-5 (%) 5
DISTORTION

FNO.= 1 : 6.3 d Line
g Line
C Line

-0.1  0.1
SPHERICAL
ABERRATION
CHROMATIC
ABERRATION

W = 7.7°

-0.01  0.01
LATERAL
CHROMATIC
ABERRATION

W = 7.7°

S
M

-0.1  0.1
ASTIGMATISM

W = 7.7°

-5 (%) 5
DISTORTION

ZOOM LENS SYSTEM

BACKGROUND OF THE INVENTION

1. Field of the Invention

The present invention relates to a lens system, which is inexpensive, has adequate telecentricity and a zoom ratio of approximately 4.0, to be used in a small and light-weight digital camera, etc.

2. Description of the Prior Art

In recent years, further miniaturization of digital compact cameras due to further miniaturization of electronic components have progressed, and further miniaturization of the photographing optical system is also in demand.

Furthermore, due to higher pixelization of imaging devices, photographing optical systems are required to have higher resolution.

In order to prevent shading and color shift, excellent telecentricity, by which light emitting from the rearmost lens surface is orthogonally incident on the imaging surface, is required in the photographing optical system of a digital camera.

A negative-lead type lens system having a zoom ratio of approximately 3 is often utilized as the zoom lens system of a compact digital camera. Since a negative-lead type lens system can achieve a wide angle-of-view at the short focal length extremity, and can have smaller lens diameters, especially, the diameter of the most object-side lens group, such a lens system is suitable for a retractable zoom lens system in which the distances between lens groups are reduced as the lens groups are being retracted (in an optical axis direction) to an accommodating position.

Furthermore, such a zoom lens system having three lens groups, e.g., a lens group having a negative refractive power (hereinafter, a negative lens group), a lens group having a positive refractive power (hereinafter, a positive lens group) and a positive lens group, in this order from the object, is often utilized, since the exit pupil has to be positioned sufficiently away from the imaging plane.

Examples of the prior art can be found in Japanese Unexamined Patent Publication Nos. 2002-277740, 2005-70696 and 2005-70697.

In the case of a zoom lens system having a zoom ratio exceeding 4.0, it is common to employ a positive-lead type lens system. Such a positive-lead type lens system is suitable for reducing the overall length of the lens system; however, the diameter of the first lens group is larger, and is not suitable for the retractable zoom lens camera with a telescopic lens barrel which is arranged to advance and retract.

In Japanese Unexamined Patent Publication No. 2002-277740, zoom lens systems having a zoom ratio in a range of approximately 2.4 through 3.0 are disclosed; however, the zoom lens systems which have a large zoom ratio have a long overall length, so that further miniaturization is not sufficiently achieved.

Japanese Unexamined Patent Publication Nos. 2005-70696 and 2005-70697 disclose relatively smaller optical systems; however, the zoom ratio thereof is approximately 3.0, which is insufficient. Furthermore, further miniaturization is not sufficiently achieved.

Namely, if attempts are made to achieve an optical system in which aberrations are suitably corrected without increasing the size of the optical system, the number of lens elements has to be increased, and more aspherical lens elements have to be employed, which increases the costs of the optical system.

In a zoom lens system for a telescopic retractable zoom lens camera, a negative-lead type lens system is desirable.

However, if the zoom ratio is increased up to approximately 4.0, the zoom lens system tends to be longer in the optical axis direction, and the correcting of aberrations becomes difficult.

SUMMARY OF THE INVENTION

The present invention provides a zoom lens system which is a negative-lead type lens system having three lens groups, has a zoom ratio exceeding 4.0, and covers a zooming range (focal length range) from a wide-angle to a telephoto angle; and in the zoom lens system, the correcting of aberrations is suitably performed.

The present invention has been devised as a result of researching lens arrangements for negative-lead type lens systems having three lens groups, especially in regard to the lens arrangement of the first lens group.

According to an aspect of the present invention, there is provided a zoom lens system including a negative first lens group, a positive second lens group, and a positive third lens group, in this order from the object.

Upon zooming from the short focal length extremity to the long focal length extremity, the distance between the negative first lens group and the positive second lens group decreases, and the distance between the positive second lens group and the positive third lens group increases.

The negative first lens group includes a negative first lens element, a positive or negative second lens element having a weaker refractive power, and a positive third lens element, in this order from the object.

The zoom lens system satisfied the following condition:

$$-0.25 < f1/fp < 0.25 \, (f1 < 0) \qquad (1)$$

wherein f1 designates the focal length of the negative first lens group; and fp designates the focal length of the second lens element.

The second lens element of the negative first lens group preferably satisfies the following condition:

$$-0.3 < (ra-rb)/(ra+rb) < 0.3 \qquad (2)$$

wherein ra designates a radius of curvature of the object-side surface of the second lens element of the negative first lens group; and rb designates a radius of curvature of the image-side surface of the second lens element of the negative first lens group.

The second lens element of the negative first lens group is arranged to have at least one aspherical surface, and preferably satisfies the following condition:

$$n2 < 1.55 \qquad (3)$$

wherein n2 designates the refractive index of the d-line of the second lens element.

The positive third lens group is arranged to function as a focusing lens group, and includes a biconvex plastic lens element having at least one aspherical surface.

The zoom lens system satisfies the following conditions:

$$3.1 < f2/rs < 3.6 \qquad (4)$$

$$0.6 < f2/f3 < 1.0 \qquad (5)$$

wherein f2 designates the focal length of the positive second lens group;

rs designates a radius of curvature of the most image-side surface of the positive second lens group; and f3 designates the focal length of the positive third lens group.

Upon zooming from the short focal length extremity to the long focal length extremity, the positive second lens group is monotonically moved toward the object, and satisfies the following condition:

$$3.2 < m2t/m2w < 3.8 \quad (6)$$

wherein m2t designates a magnification of the positive second lens group, at the long focal length extremity, when an object at infinity is in an in-focus state; and m2w designates a magnification of the positive second lens group, at the short focal length extremity, when an object at infinity is in an in-focus state.

Upon zooming from the short focal length extremity to the long focal length extremity, the positive third lens group is monotonically moved toward the image, and satisfies the following condition:

$$1.05 < m3t/m3w < 1.3 \quad (7)$$

wherein m3t designates a magnification of the positive third lens group, at the long focal length extremity, when an object at infinity is in an in-focus state; and m3w designates a magnification of the positive third lens group, at the short focal length extremity, when an object at infinity is in an in-focus state.

The negative first lens group preferably satisfies the following condition:

$$0.2 < t1/|f1| < 0.4 \quad (8)$$

wherein t1 designates a distance from the most object-side surface of the negative first lens group to the most image-side surface thereof; and f1 designates the focal length of the negative first lens group.

The most object-side positive lens element of the positive second lens group is preferably provided, on each surface, with an aspherical surface which is formed so that curvature becomes smaller toward the periphery, compared with a paraxial spherical surface (paraxial area).

As an alternative, the most object-side positive lens element of the positive second lens group is preferably formed as a biconvex positive lens element, and satisfies the following condition:

$$65 < vp \quad (9)$$

wherein vp designates the Abbe number of the biconvex positive lens element.

The second lens group preferably includes a positive lens element, a positive lens element, and a negative lens element, in this order from the object.

The present disclosure relates to subject matter contained in Japanese Patent Application No. 2007-202607 (filed on Aug. 3, 2007) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first embodiment of a zoom lens system according to the present invention;

FIGS. 2A, 2B, 2C and 2D show aberrations occurred in the lens arrangement shown in FIG. 1 at the short focal length extremity, when an object at infinity is in an in-focus state;

FIG. 5 shows a lens arrangement of a second embodiment of a zoom lens system according to the present invention;

FIGS. 6A, 6B, 6C and 6D show aberrations occurred in the lens arrangement shown in FIG. 5 at the short focal length extremity, when an object at infinity is in an in-focus state;

FIGS. 7A, 7B, 7C and 7D show aberrations occurred in the lens arrangement shown in FIG. 5 at an intermediate focal length, when an object at infinity is in an in-focus state;

FIGS. 8A, 8B, 8C and 8D show aberrations occurred in the lens arrangement shown in FIG. 5 at the long focal length extremity, when an object at infinity is in an in-focus state;

FIGS. 11A, 11B, 11C and 11D show aberrations occurred in the lens arrangement shown in FIG. 9 at an intermediate focal length, when an object at infinity is in an in-focus state;

FIGS. 12A, 12B, 12C and 12D show aberrations occurred in the lens arrangement shown in FIG. 9 at the long focal length extremity, when an object at infinity is in an in-focus state;

FIG. 13 shows a lens arrangement of a fourth embodiment of a zoom lens system according to the present invention;

FIGS. 14A, 14B, 14C and 14D show aberrations occurred in the lens arrangement shown in FIG. 13 at the short focal length extremity, when an object at infinity is in an in-focus state;

FIGS. 15A, 15B, 15C and 15D show aberrations occurred in the lens arrangement shown in FIG. 13 at an intermediate focal length, when an object at infinity is in an in-focus state;

FIGS. 16A, 16B, 16C and 16D show aberrations occurred in the lens arrangement shown in FIG. 13 at the long focal length extremity, when an object at infinity is in an in-focus state;

DESCRIPTION OF THE PREFERRED EMBODIMENTS

Figure 21:
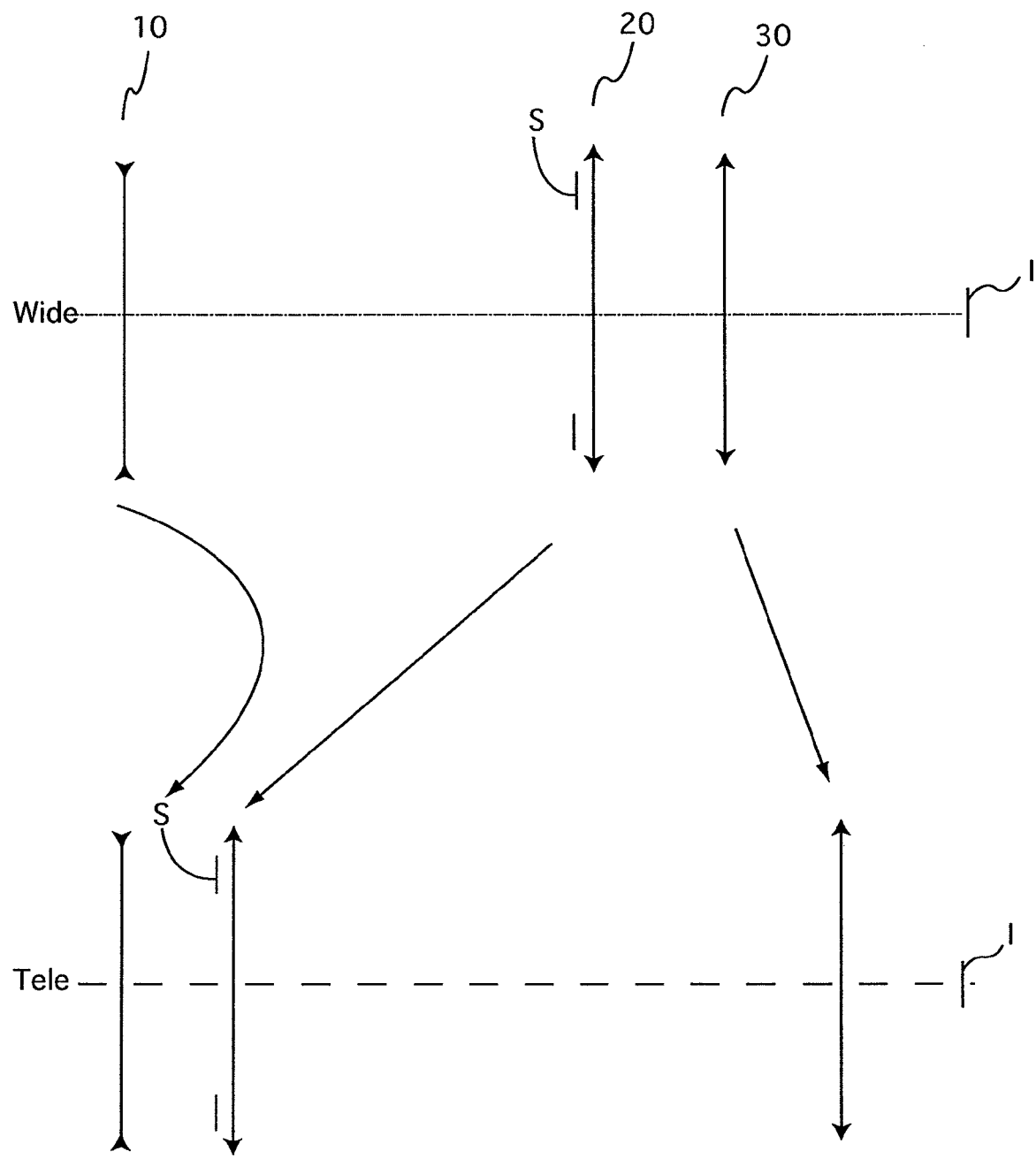
FIG. 21 is the schematic view of the lens-group moving paths for the zoom lens system according to the present invention.

A zoom lens system of the present invention, as shown in the lens-group moving paths of FIG. 21, includes a negative first lens group 10, a positive second lens group 20, and a positive third lens group 30, in this order from the object.

Upon zooming from the short focal length extremity to the long focal length extremity, the distance between the negative first lens group 10 and the positive second lens group 20 decreases, and the distance between the positive second lens group 20 and the positive third lens group 30 increases.

More specifically, the negative first lens group 10 first moves toward the image, and thereafter moves toward the object, the positive second lens group 20 monotonically moves toward the object, and the positive third lens group 30 monotonically moves toward the image.

A diaphragm S is provided between the negative first lens group 10 and the positive second lens group 20, and integrally moves with the positive second lens group 20.

Focusing is performed by the positive third lens group 30.

The symbol 'I' designates the imaging plane.

As shown in each embodiment of FIGS. 1, 5, 9, 13 and 17, the negative first lens group 10 includes a negative lens element (first lens element) 11 having a concave surface facing toward the image, a meniscus lens element (second lens element) 12, with a weaker refractive power, having the convex surface facing toward the object, and a positive lens element (third lens element) 13 having a convex surface facing toward the object, in this order from the object.

The positive second lens group 20 includes a biconvex positive lens element (fourth lens element) 21, and a cemented lens having a biconvex positive lens element (fifth lens element) 22 and a biconcave negative lens element (sixth lens element) 23, in this order from the object.

The positive third lens group 30 includes a biconvex positive lens element (seventh lens element) 31.

The symbol 'C' designates a cover glass (filter group) positioned in front of an imaging device.

The second lens element 12 of the negative first lens group 10, the fourth lens element 21 of the positive second lens group 20, and the seventh lens element 31 of the positive third lens group 30 are all made of plastic. These plastic lens elements can be provided with at least one aspherical surface.

The second lens element 12 of the "weaker refractive power" refers to a lens element in which the paraxial area does not have refractive power, and the peripheral area has a lens function (aberration-correcting function) by an aspherical surface. In other words, the second lens element 12 of the "weaker refractive power" is not designed to have a refractive power at the paraxial area thereof, but to correct aberrations at the peripheral area. Therefore in the second lens element 12, a refractive power is either positive or negative; and the paraxial area can be formed as a parallel plane plate, or alternatively, can be formed to have equal radius of curvatures on both surfaces. In the case the parallel plane plate or equal radius of curvatures at the paraxial area, the value of condition (1) is zero.

In the case of a negative-lead type zoom lens system, if an attempt is made to increase the zoom ratio, the entire zoom lens system becomes longer. In order to avoid such an increase in length, the refractive power of each lens group is made stronger so that the traveling distance of each lens group becomes shorter. However, the amount of aberrations on the refractive surface becomes larger, and the correcting of aberrations is difficult.

Condition (1) is to be satisfied by the second lens element 12, in the case when the negative first lens group 10 includes the negative first lens element 11, the second lens element 12 with a weaker refractive power, and the positive third lens element 13, in this order from the object.

In the case where the second lens element 12 has a weak positive refractive power in the paraxial area (Embodiments 2 and 5), if the positive refractive power of the second lens element 12 becomes stronger to the extent that f1/fp exceeds the lower limit of condition (1), the correcting of coma, astigmatism and lateral chromatic aberration cannot be made at the short focal length extremity. This is because the first lens element 11 has to be provided with a stronger negative refractive power so that the negative first lens group 10 as a whole needs to have a negative refractive power of a predetermined strength.

In the case where the second lens element 12 has a weak negative refractive power in the paraxial area (Embodiments 1, 3 and 4), if the negative refractive power of the second lens element 12 becomes stronger to the extent that f1/fp exceeds the upper limit of condition (1), the negative refractive power of the first lens element 11 becomes relatively weaker, so that the negative refractive power is distributed over the two negative lens elements 11 and 12. This arrangement seems to be advantageous for correcting aberrations; however, the peripheral edge of the second lens element 12 becomes thicker, so that the first lens element 11 is inevitably away from the diaphragm S. Consequently, the diameter of the first lens element 11 becomes larger.

If an attempt is made to forcibly make the diameter of the first lens element 11 smaller, off-axis aberrations, such as coma, etc., largely occur at the short focal length extremity.

Condition (2) specifies the shape of the second lens element 12 (the meniscus lens element having the convex surface facing toward the object) in the negative first lens group 10. In other words, this condition is to suitably correct aberrations without increasing the thickness of the negative first lens group 10.

If (ra−rb)/(ra+rb) exceeds the lower limit of condition (2), the radius of curvature of the image-side concave surface of the second lens element 12 becomes larger with respect to that of the object-side convex surface thereof, so that the positive refractive power of the second lens element 12 becomes too strong. Consequently, the angle-of-incidence of a bundle of peripheral light rays on the second lens element 12 becomes larger, and coma and astigmatism largely occur at the short focal length extremity.

If (ra−rb)/(ra+rb) exceeds the upper limit of condition (2), the radius of curvature of the object-side convex surface of the second lens element 12 becomes larger with respect to that of the image-side concave surface thereof, so that the negative refractive power of the second lens element 12 becomes too strong. Consequently, an area on the second lens element 12, where a bundle of the outermost peripheral light rays passing through the first lens element 11 is incident, becomes father from the optical axis. Namely, the height of the incident point from the optical axis becomes higher.

If an attempt is made to forcibly reduce the height, aberrations, such as astigmatism, etc., largely occur at the short focal length extremity.

Condition (3) specifies the refractive index of the second lens element 12.

The second lens element 12 has a weaker refractive power which satisfies condition (1), so that a glass material which has a low refractive index which satisfies condition (3) can be employed.

For example, in the case where the second lens element 12 is made of plastic, it becomes easy to form an aspherical surface thereon at low cost. With at least one aspherical surface, the amount of aberrations due to an increase of the zoom ratio can be reduced.

In the optical system of a digital camera, telecentricity is required; however, such telecentricity prevents the digital camera from attaining further miniaturization thereof.

In order to maintain telecentricity and make the entire zoom lens system shorter, further optical-design consideration is necessary in distribution of refractive power over each lens group, and in lens arrangements. In this respect, the zoom lens system of the present invention is preferably arranged to form the final surface (the most image-side surface) of the positive second lens group 20 as a diverging surface (a concave surface facing toward the image) which satisfies condition (4).

With the diverging surface formed at the final surface of the positive second lens group 20, the height of a bundle of off-axis light rays from the optical axis is increased at the short focal length extremity; and the bundle of off-axis light rays is made parallel with the optical axis by the positive third lens group 30 having a relatively stronger refractive power. Due to this arrangement, telecentricity is maintained and the entire zoom lens system is made shorter at the same time, and the distance between the positive second lens group 20 and the positive third lens group 30 is made shorter.

If f2/rs exceeds the lower limit of condition (4), the divergent refractive power on the final surface of the positive second lens group 20 becomes too strong, so that the correcting of aberrations which occur on the final surface cannot be carried out.

If f2/rs exceeds the upper limit of condition (4), the divergent refractive power becomes weaker, so that the positive refractive power of the positive third lens group 30 has to be made stronger. Consequently, it becomes difficult to reduce changes in field curvature when an object at a close distance is photographed at the long focal length extremity.

In the zoom lens system according to the present invention, the positive third lens group 30 is arranged to be a focusing lens group. By moving the positive third lens group 30 along the optical axis, an object at a close distance is brought into an in-focus state.

The positive third lens group 30 preferably includes a biconvex positive plastic lens element having at least one aspherical surface, and satisfies condition (5).

Condition (5) specifies the refractive power of the positive third lens group 30 with respect to that of the positive second lens group 20. In other words, condition (5) is provided to attain telecentricity, i.e., diverging off-axis light rays from the final surface of the positive second lens group 20 are made parallel with the optical axis by the positive third lens group 30

If f2/f3 exceeds the lower limit of condition (5), the refractive power of the positive third lens group 30 becomes weaker. Consequently, it becomes difficult to maintain telecentricity, while miniaturization of the zoom lens system is attained. The only way to achieve telecentricity while maintaining miniaturization is to increase the refractive power of each lens group. However, in such a case, the correcting of aberrations is difficult over the entire zooming range.

If f2/f3 exceeds the upper limit of condition (5), the refractive power of the positive third lens group 30 becomes too strong with respect to the positive second lens group 20. As a result, optical performance of the zoom lens system upon focusing undesirably varies according to the change in a closer distance.

In addition to satisfying condition (5), cost reduction can be attained by forming the positive third lens group 30 as a positive plastic single lens element; and by making both surfaces of the positive plastic single lens element aspherical, deterioration of optical performance can be reduced upon focusing toward an object at a closer distance.

In the zoom lens system of the present invention, as shown in the lens-group moving paths of FIG. 21, upon zooming from the short focal length extremity to the long focal length extremity, the positive second lens group 20 monotonically moves toward the object, and the positive third lens group 30 monotonically moves toward the image.

Condition (6) specifies the ratio of a magnification of the positive second lens group 20 at the short focal length extremity to a magnification thereof at the long focal length extremity.

Condition (7) specifies the ratio of a magnification of the positive third lens group 30 at the short focal length extremity to a magnification thereof at the long focal length extremity.

These conditions are provided for the purpose of suitably determining the refractive power of the positive second lens group 20 and that of the positive third lens group 30, and suitably positioning the positive second lens group 20 and the positive third lens group 30 along the optical axis, when the zoom ratio of the zoom lens system is increased. By satisfying these conditions, an increase in size of the zoom lens system can be prevented as much as possible.

If m2t/m2w exceeds the lower limit of condition (6), an increase in the magnification of the positive second lens group 20 from the short focal length extremity to the long focal length extremity is smaller, so that it is difficult to achieve a desired zoom ratio.

If m2t/m2w exceeds the upper limit of condition (6), the magnification of the positive second lens group 20 becomes too large, so that the traveling distance of the positive second lens group 20 becomes longer. Consequently, further miniaturization of the zoom lens system become difficult. On the other hand, miniaturization of the zoom lens system would be possible by making the refractive power stronger (i.e., the traveling distance thereof is made shorter); however, the correcting of aberrations becomes difficult over the entire zooming range from the short focal length extremity to the long focal length extremity; and an optimal optical performance cannot be achieved.

If m3t/m3w exceeds the lower limit of condition (7), an increase in the magnification of the positive third lens group 30 from the short focal length extremity to the long focal length extremity is smaller. Consequently, it either becomes difficult to achieve a desired zoom ratio, or the burden of zooming on the positive second lens group 20 becomes larger.

If m3t/m3w exceeds the upper limit of condition (7), the traveling distance of the positive third lens group 30 becomes longer. Therefore the positive refractive power of the positive third lens group 30 has to be made stronger to avoid an insufficient (too-short) back focal distance at the long focal length extremity. Consequently, it becomes difficult to reduce changes in field curvature when an object at close distance is photographed at the long focal length extremity.

The most object-side lens element 21 of the positive second lens group 20 is a positive lens element which is arranged to bear most of the positive refractive power of the positive second lens group 20. The positive lens element 21 is arranged to correct spherical aberration and coma, over the entire zooming range, which occur when the zoom lens system is made shorter. The correcting of aberrations can be more effectively made by providing an aspherical surface on each surface of the positive lens element 21; and the aspherical surface is formed so that curvature becomes smaller toward the periphery, compared with a paraxial spherical surface. Due to this arrangement, the correcting of aberration is performed by the two aspherical surfaces, so that the occurrence of aberrations on each surface can be reduced. Consequently, it is possible to reduce the sensitivity on deterioration of optical performance due to decentration of a lens element in an assembly stage.

In the zoom lens system of the present invention, the negative first lens group 10 includes three lens elements, so that the negative first lens group 10 tends to be thicker.

Condition (8) specifies the thickness (length) of the negative first lens group 10 in order to reduce the length of the zoom lens system at an accommodation position.

If t1/|f1| exceeds the lower limit of Condition (8), the thickness (length) of the negative first lens group 10 becomes too small (short) with respect to the focal length of the negative first lens group 10, so that the correcting of off-axis aberrations at the short focal length extremity becomes difficult.

If t1/|f1| exceeds the upper limit of Condition (8), the thickness (length) of the negative first lens group 10 becomes too large (long) with respect to the focal length of the negative first lens group 10, so that the length of the zoom lens system at the accommodation position undesirably becomes longer.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the tables, FNO. designates the F-number, f designates the focal length of the entire zoom lens system, W designates the half angle-of-view (°), fB designates the back focal distance, r designates the radius of curvature, d designates the lens-element thickness or a distance between lens elements (lens groups), $N_d$ designates the refractive index of the d-line, and ν designates the Abbe number.

The values of the F-number, the focal length of the entire zoom lens system (f), the half angle-of-view (°) (W) and the back focal distance (fB), and the values of the lens-element thickness or a distance between lens elements (lens groups) (d) are indicated in the order of the short focal length extremity, an intermediate focal length and the long focal length extremity.

In addition to the above, an aspherical surface which is symmetrical with respect to the optical axis is defined as follows:

$$x = cy^2/[1+\{1-(1+K)c^2y^2\}^{1/2}] + A4y^4 + A6y^6 + A8y^8 + A10y^{10} \ldots$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 shows the lens arrangement of the first embodiment of a zoom lens system according to the present invention. FIGS. 2A through 2D show aberrations occurred in the lens arrangement shown in FIG. 1, when an object at infinity is in an in-focus state at the short focal length extremity. FIGS. 3A through 3D show aberrations occurred in the lens arrangement shown in FIG. 1, when an object at infinity is in an in-focus state at an intermediate focal length. FIGS. 4A through 4D show aberrations occurred in the lens arrangement shown in FIG. 1, when an object at infinity is in an in-focus state at the long focal length extremity.

Table 1 shows the numerical data of the first embodiment.

The negative first lens group 10 (surface Nos. 1 through 6) includes a biconcave negative lens element (first lens element) 11, a negative meniscus lens element (second lens element) 12 having the convex surface facing toward the object, and a positive meniscus lens element (third lens element) 13 having the convex surface facing toward the object, in this order from the object. Note that the negative meniscus lens element (second lens element) 12 is made of plastic, has aspherical surfaces on both surfaces, and has a weak negative refractive power.

The positive second lens group 20 (surface Nos. 7 through 11) includes a biconvex plastic lens element (fourth lens element) 21 having aspherical surfaces on both surfaces, and a cemented lens having a positive lens element (fifth lens element) 22 and a negative lens element (sixth lens element) 23, in this order from the object. The aspherical surfaces of the biconvex plastic lens element 21 are formed so that curvature becomes smaller toward the periphery, compared with a paraxial spherical surface.

The positive third lens group 30 (surface Nos. 12 through 13) includes a biconvex plastic lens element 31 (seventh lens element) having aspherical surfaces on both surfaces thereof.

Surface Nos. 14 through 17 define a cover glass (filter group) C which is positioned in front of an imaging device.

A diaphragm S is provided 0.800 in front (on the object side) of the positive second lens group 20 (surface No. 7).

TABLE 1

FNo. = 1:2.6-3.8-6.2
f = 6.20-11.60-24.80 (Zoom Ratio = 4.00)
W = 31.4-17.0-8.3

| Surf. No. | r | d | Nd | ν |
|---|---|---|---|---|
| 1 | −77.095 | 0.700 | 1.77250 | 49.6 |
| 2 | 7.047 | 1.480 | — | — |
| 3* | 27.514 | 0.900 | 1.54358 | 55.7 |
| 4* | 22.720 | 0.051 | — | — |
| 5 | 13.280 | 1.750 | 1.74000 | 28.3 |
| 6 | 593.598 | 18.386-8.852-1.620 | — | — |
| 7* | 5.832 | 2.079 | 1.59240 | 68.3 |
| 8* | −22.168 | 0.100 | — | — |
| 9 | 8.784 | 1.700 | 1.80400 | 46.6 |
| 10 | −14.805 | 1.000 | 1.80610 | 33.3 |
| 11 | 3.703 | 4.506-11.368-23.240 | — | — |
| 12* | 25.000 | 1.800 | 1.54358 | 55.7 |
| 13* | −16.478 | 3.167-1.684-1.200 | — | — |
| 14 | ∞ | 0.500 | 1.51633 | 64.1 |
| 15 | ∞ | 0.510 | — | — |
| 16 | ∞ | 0.500 | 1.51633 | 64.1 |
| 17 | ∞ | 0.590(=fB) | | |

TABLE 1-continued

Aspherical surface data (the aspherical surface coefficients not indicated are zero (0.00)):

| Surf. | K | A4 | A6 |
|---|---|---|---|
| No. 3 | −0.10 | $0.18118 \times 10^{-3}$ | $-0.22828 \times 10^{-5}$ |
| No. 4 | −0.10 | $-0.14308 \times 10^{-3}$ | $-0.21763 \times 10^{-5}$ |
| No. 7 | −0.10 | $0.61047 \times 10^{-4}$ | $0.74034 \times 10^{-5}$ |
| No. 8 | −0.10 | $0.19621 \times 10^{-3}$ | $0.12596 \times 10^{-4}$ |
| No. 12 | −0.10 | $-0.34857 \times 10^{-3}$ | $0.31217 \times 10^{-4}$ |
| No. 13 | −0.10 | $-0.45687 \times 10^{-3}$ | $0.32045 \times 10^{-4}$ |

| Surf. | A8 | A10 |
|---|---|---|
| No. 3 | $0.67111 \times 10^{-6}$ | |
| No. 4 | $0.38456 \times 10^{-6}$ | $0.35925 \times 10^{-9}$ |
| No. 7 | $-0.10731 \times 10^{-6}$ | |
| No. 8 | $-0.66327 \times 10^{-6}$ | |
| No. 12 | $0.71511 \times 10^{-6}$ | $0.26771 \times 10^{-8}$ |
| No. 13 | $0.11746 \times 10^{-5}$ | |

The symbol * designates the aspherical surface which is rotationally symmetrical with respect to the optical axis.

Embodiment 2

FIG. 5 shows the lens arrangement of the second embodiment of a zoom lens system according to the present invention. FIGS. 6A through 6D show aberrations occurred in the lens arrangement shown in FIG. 5, when an object at infinity is in an in-focus state at the short focal length extremity. FIGS. 7A through 7D show aberrations occurred in the lens arrangement shown in FIG. 5, when an object at infinity is in an in-focus state at an intermediate focal length. FIGS. 8A through 8D show aberrations occurred in the lens arrangement shown in FIG. 5, when an object at infinity is in an in-focus state at the long focal length extremity.

Table 2 shows the numerical data of the second embodiment.

The basic lens arrangement of the second embodiment is the same as that of the first embodiment except that the second lens element 12 of the negative first lens group 10 is a meniscus lens element which has the convex surface facing toward the object, has a weak positive refractive power at the paraxial areas, and has an aspherical surface on each of the two surfaces.

The diaphragm S is provided 0.800 in front (on the object side) of the positive second lens group 20 (surface No. 7).

TABLE 2

FNo. = 1:2.6-3.8-6.3
f = 6.36-11.60-26.08 (Zoom Ratio = 4.10)
W = 30.8-17.1-7.9

| Surf. No. | r | d | Nd | ν |
|---|---|---|---|---|
| 1 | −69.450 | 0.700 | 1.72916 | 54.7 |
| 2 | 6.965 | 1.404 | — | — |
| 3* | 18.024 | 0.900 | 1.54358 | 55.7 |
| 4* | 19.722 | 0.100 | — | — |
| 5 | 13.715 | 1.750 | 1.72825 | 28.5 |
| 6 | 106.964 | 18.684-9.837-1.609 | — | — |
| 7* | 5.415 | 2.036 | 1.48749 | 70.2 |
| 8* | −17.506 | 0.100 | — | — |
| 9 | 8.641 | 1.700 | 1.86300 | 41.5 |
| 10 | −8.185 | 1.000 | 1.80610 | 33.3 |
| 11 | 3.688 | 4.533-11.782-24.321 | — | — |
| 12* | 40.000 | 1.800 | 1.54358 | 55.7 |
| 13* | −14.163 | 3.546-1.491-1.200 | — | — |
| 14 | ∞ | 0.500 | 1.51633 | 64.1 |
| 15 | ∞ | 0.510 | — | — |
| 16 | ∞ | 0.500 | 1.51633 | 64.1 |
| 17 | ∞ | 0.590(=fB) | | |

Aspherical surface data (the aspherical surface coefficients not indicated are zero (0.00)):

| Surf. | K | A4 | A6 |
|---|---|---|---|
| No. 3 | −0.10 | $-0.34307 \times 10^{-4}$ | $0.78080 \times 10^{-7}$ |
| No. 4 | −0.10 | $-0.35498 \times 10^{-3}$ | $-0.20769 \times 10^{-5}$ |
| No. 7 | −0.10 | $-0.35290 \times 10^{-4}$ | $0.12611 \times 10^{-4}$ |
| No. 8 | −0.10 | $0.23009 \times 10^{-3}$ | $0.21956 \times 10^{-4}$ |
| No. 12 | −0.10 | $-0.47825 \times 10^{-3}$ | $0.17588 \times 10^{-4}$ |
| No. 13 | −0.10 | $-0.65494 \times 10^{-3}$ | $0.23807 \times 10^{-4}$ |

| Surf. | A8 | A10 |
|---|---|---|
| No. 3 | $0.62210 \times 10^{-6}$ | |
| No. 4 | $0.48099 \times 10^{-6}$ | $-0.23019 \times 10^{-8}$ |
| No. 7 | $-0.65600 \times 10^{-6}$ | |
| No. 8 | $-0.14447 \times 10^{-5}$ | |
| No. 12 | $0.17369 \times 10^{-5}$ | $-0.14850 \times 10^{-7}$ |
| No. 13 | $0.16181 \times 10^{-5}$ | |

The symbol * designates the aspherical surface which is rotationally symmetrical with respect to the optical axis.

Embodiment 3

Figure 3A:
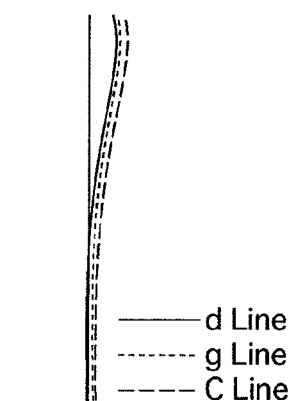
FIGS. 3A, 3B, 3C and 3D show aberrations occurred in the lens arrangement shown in FIG. 1 at an intermediate focal length, when an object at infinity is in an in-focus state.
Figure 3B:
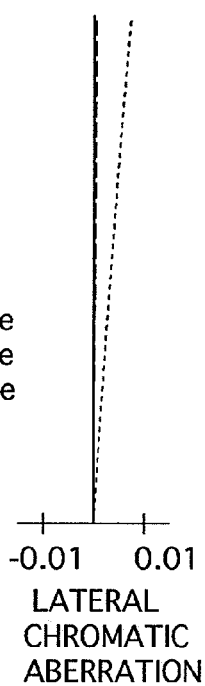
Figure 3C:
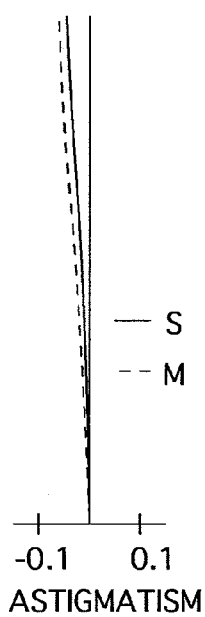
Figure 3D:
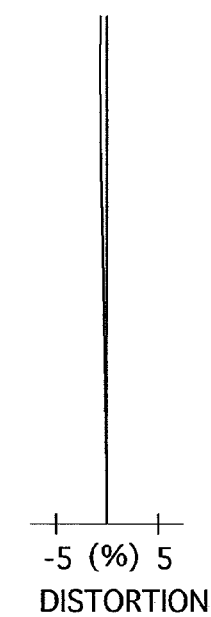
Figure 4A:
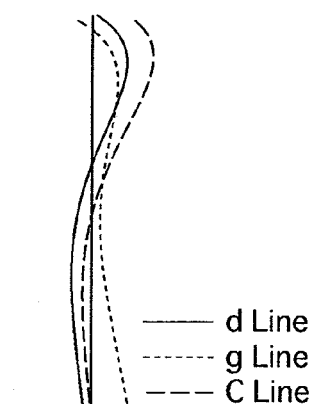
FIGS. 4A, 4B, 4C and 4D show aberrations occurred in the lens arrangement shown in FIG. 1 at the long focal length extremity, when an object at infinity is in an in-focus state.
Figure 4B:
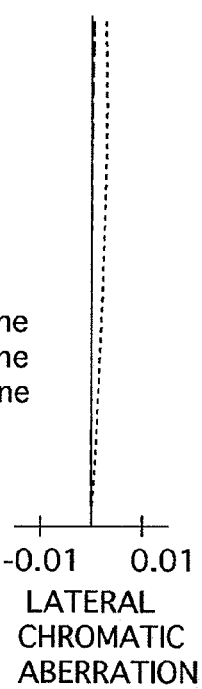
Figure 4C:
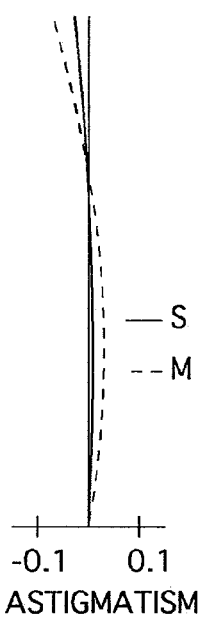
Figure 4D:
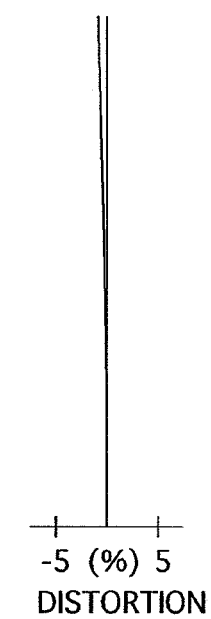
Figures 9, 10A, 10B, 10C, 10D:
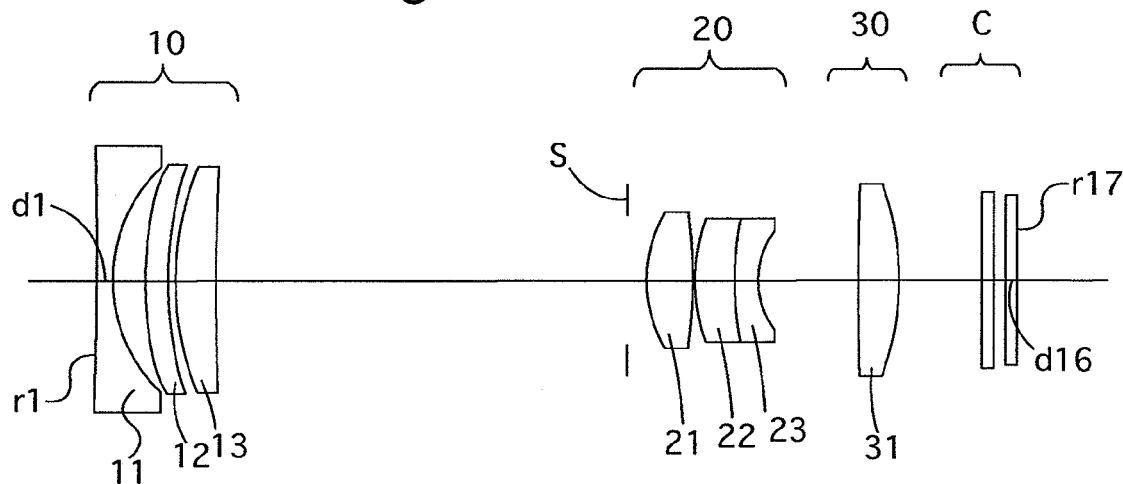
FIG. 9 shows a lens arrangement of a third embodiment of a zoom lens system according to the present invention.
FIGS. 10A, 10B, 10C and 10D show aberrations occurred in the lens arrangement shown in FIG. 9 at the short focal length extremity, when an object at infinity is in an in-focus state.

FIG. 9 shows the lens arrangement of the third embodiment of a zoom lens system according to the present invention. FIGS. 10A through 10D show aberrations occurred in the lens arrangement shown in FIG. 9, when an object at infinity is in an in-focus state at the short focal length extremity. FIGS. 11A through 11D show aberrations occurred in the lens arrangement shown in FIG. 9, when an object at infinity is in an in-focus state at an intermediate focal length. FIGS. 12A through 12D show aberrations occurred in the lens arrangement shown in FIG. 9, when an object at infinity is in an in-focus state at the long focal length extremity.

Table 3 shows the numerical data of the third embodiment.

The basic lens arrangement of the third embodiment is the same as that of the first embodiment except the fifth lens element 22 and the sixth lens element 23 which constitute the cemented lens of the positive second lens group 20. More specifically, the fifth lens element 22 is a positive meniscus lens element having the convex surface facing toward the object, and the sixth lens element 23 is a negative meniscus lens element having the concave surface facing toward the image.

The second lens element 12 of the negative first lens group 10 has a weak positive refractive power at the paraxial areas.

The diaphragm S is provided 0.800 in front (on the object side) of the positive second lens group 20 (surface No. 7).

TABLE 3

FNo. = 1:2.6-3.8-6.2
f = 6.21-11.66-24.91 (Zoom Ratio = 4.01)
W = 31.4-17.0-8.3

| Surf. No. | r | d | Nd | ν |
|---|---|---|---|---|
| 1 | −186.915 | 0.70 | 1.72916 | 54.7 |
| 2 | 6.739 | 1.43 | — | — |
| 3* | 16.220 | 1.00 | 1.54358 | 55.7 |
| 4* | 14.059 | 0.34 | — | — |
| 5 | 13.073 | 1.75 | 1.72825 | 28.5 |
| 6 | 105.373 | 18.62-9.24-1.61 | — | — |
| 7* | 5.550 | 2.00 | 1.49700 | 81.6 |
| 8* | −18.331 | 0.10 | — | — |

TABLE 3-continued

| | | | | |
|---|---|---|---|---|
| 9 | 8.162 | 1.70 | 1.77250 | 49.6 |
| 10 | 14.193 | 1.00 | 1.71736 | 29.5 |
| 11 | 3.646 | 4.35-11.88-23.99 | — | — |
| 12* | 40.000 | 1.80 | 1.54358 | 55.7 |
| 13* | −14.546 | 3.74-1.89-2.03 | — | — |
| 14 | ∞ | 0.50 | 1.51633 | 64.1 |
| 15 | ∞ | 0.51 | — | — |
| 16 | ∞ | 0.50 | 1.51633 | 64.1 |
| 17 | ∞ | 0.590(=fB) | | |

Aspherical surface data (the aspherical surface coefficients not indicated are zero (0.00)):

| Surf. | K | A4 | A6 |
|---|---|---|---|
| No. 3 | −0.10 | $-0.19409 \times 10^{-3}$ | $0.85205 \times 10^{-5}$ |
| No. 4 | −0.10 | $-0.51591 \times 10^{-3}$ | $0.71058 \times 10^{-5}$ |
| No. 7 | −0.10 | $0.29870 \times 10^{-4}$ | $0.17325 \times 10^{-4}$ |
| No. 8 | −0.10 | $0.15436 \times 10^{-3}$ | $0.26954 \times 10^{-4}$ |
| No. 12 | −0.10 | $-0.80505 \times 10^{-3}$ | $0.18528 \times 10^{-5}$ |
| No. 13 | −0.10 | $-0.98850 \times 10^{-3}$ | $0.74391 \times 10^{-5}$ |

| Surf. | A8 | A10 |
|---|---|---|
| No. 3 | $0.56788 \times 10^{-6}$ | |
| No. 4 | $0.43629 \times 10^{-6}$ | $-0.32794 \times 10^{-8}$ |
| No. 7 | $-0.37250 \times 10^{-6}$ | |
| No. 8 | $-0.12397 \times 10^{-5}$ | |
| No. 12 | $0.12797 \times 10^{-5}$ | $-0.60111 \times 10^{-9}$ |
| No. 13 | $0.12513 \times 10^{-5}$ | |

The symbol * designates the aspherical surface which is rotationally symmetrical with respect to the optical axis.

Embodiment 4

FIG. 13 shows the lens arrangement of the fourth embodiment of a zoom lens system according to the present invention. FIGS. 14A through 14D show aberrations occurred in the lens arrangement shown in FIG. 13, when an object at infinity is in an in-focus state at the short focal length extremity. FIGS. 15A through 15D show aberrations occurred in the lens arrangement shown in FIG. 13, when an object at infinity is in an in-focus state at an intermediate focal length. FIGS. 16A through 16D show aberrations occurred in the lens arrangement shown in FIG. 13, when an object at infinity is in an in-focus state at the long focal length extremity.

Table 4 shows the numerical data of the fourth embodiment.

The basic lens arrangement of the fourth embodiment is the same as that of the first embodiment except that the first lens element 11 of the negative first lens group 10 is a meniscus lens element having the concave surface facing toward the image.

The second lens element 12 of the negative first lens group 10 has a weak positive refractive power at the paraxial areas.

The diaphragm S is provided 0.600 in front (on the object side) of the positive second lens group 20 (surface No. 7).

TABLE 4

FNo. = 1:2.8-4.1-6.7
f = 6.26-12.30-25.10 (Zoom Ratio = 4.01)
W = 32.5-17.1-8.6

| Surf. No. | r | d | Nd | ν |
|---|---|---|---|---|
| 1 | 526.460 | 0.700 | 1.83481 | 42.7 |
| 2 | 7.848 | 0.148 | — | — |
| 3* | 7.116 | 0.900 | 1.54358 | 55.7 |
| 4* | 6.044 | 1.607 | — | — |
| 5 | 11.268 | 1.800 | 1.84666 | 23.8 |

TABLE 4-continued

| | | | | |
|---|---|---|---|---|
| 6 | 35.042 | 17.711-7.122-1.665 | — | — |
| 7* | 5.639 | 1.650 | 1.58989 | 66.8 |
| 8* | −22.488 | 0.100 | — | — |
| 9 | 7.445 | 1.527 | 1.72916 | 54.7 |
| 10 | −44.766 | 1.000 | 1.80610 | 33.3 |
| 11 | 3.602 | 3.985-10.551-22.603 | — | — |
| 12* | 57.134 | 2.000 | 1.54358 | 55.7 |
| 13* | −12.016 | 3.476-2.818-1.100 | — | — |
| 14 | ∞ | 0.500 | 1.51633 | 64.1 |
| 15 | ∞ | 0.510 | — | — |
| 16 | ∞ | 0.500 | 1.51633 | 64.1 |
| 17 | ∞ | 0.590(=fB) | | |

Aspherical surface data (the aspherical surface coefficients not indicated are zero (0.00)):

| Surf. | K | A4 | A6 |
|---|---|---|---|
| No. 3 | −0.10 | $-0.84739 \times 10^{-3}$ | $0.31745 \times 10^{-4}$ |
| No. 4 | −0.10 | $-0.11354 \times 10^{-2}$ | $0.40415 \times 10^{-4}$ |
| No. 7 | −0.10 | $0.91892 \times 10^{-4}$ | $0.18352 \times 10^{-4}$ |
| No. 8 | −0.10 | $0.16315 \times 10^{-3}$ | $0.27049 \times 10^{-4}$ |
| No. 12 | −0.10 | $0.24237 \times 10^{-4}$ | $0.21832 \times 10^{-4}$ |
| No. 13 | −0.10 | $0.13910 \times 10^{-3}$ | $0.22598 \times 10^{-4}$ |

| Surf. | A8 | A10 |
|---|---|---|
| No. 3 | $-0.24952 \times 10^{-7}$ | |
| No. 4 | $-0.37568 \times 10^{-6}$ | $0.41255 \times 10^{-8}$ |
| No. 7 | $0.16391 \times 10^{-7}$ | |
| No. 8 | $-0.86945 \times 10^{-6}$ | |
| No. 12 | $-0.20904 \times 10^{-5}$ | $0.42332 \times 10^{-7}$ |
| No. 13 | $-0.21985 \times 10^{-5}$ | $0.42676 \times 10^{-7}$ |

The symbol * designates the aspherical surface which is rotationally symmetrical with respect to the optical axis.

Embodiment 5

Figure 17:
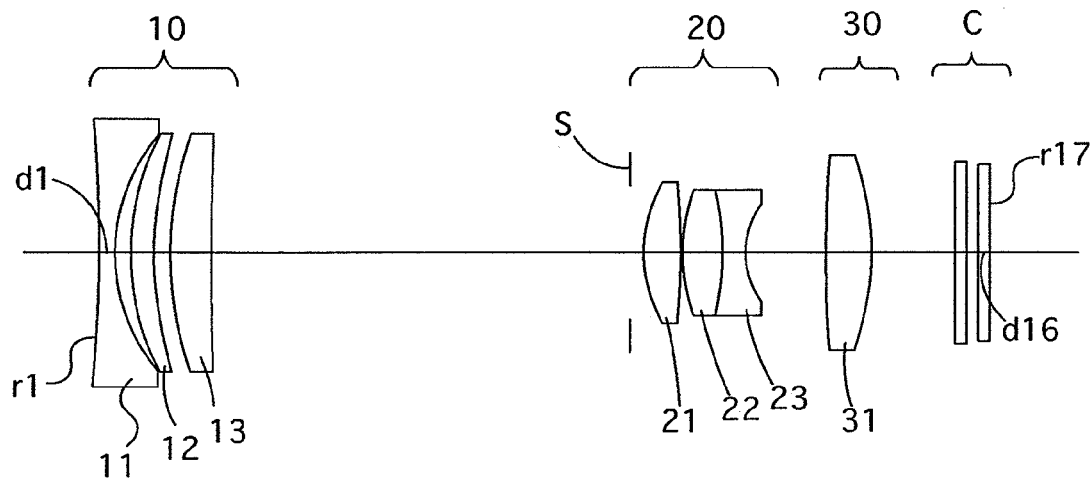
FIG. 17 shows a lens arrangement of a fifth embodiment of a zoom lens system according to the present invention.
Figure 18A:
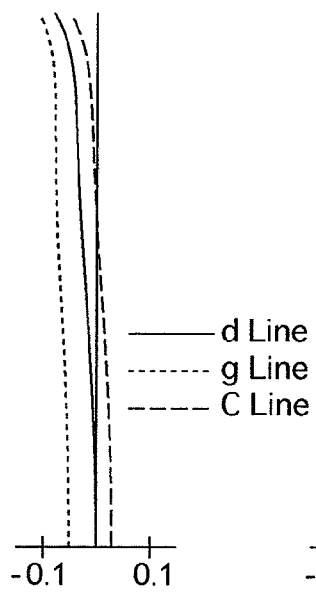
FIGS. 18A, 18B, 18C and 18D show aberrations occurred in the lens arrangement shown in FIG. 17 at the short focal length extremity, when an object at infinity is in an in-focus state.
Figure 18B:
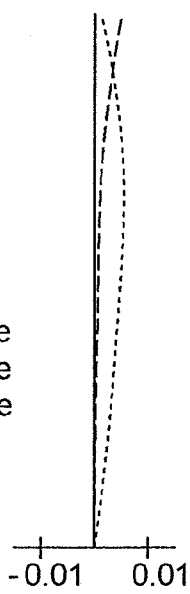
Figure 18C:
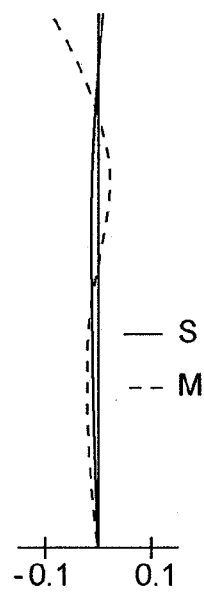
Figure 18D:
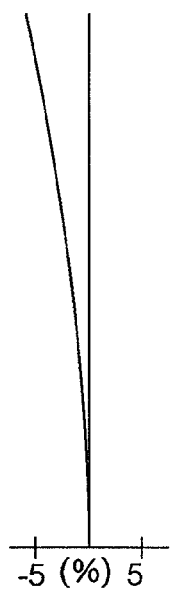
Figure 19A:
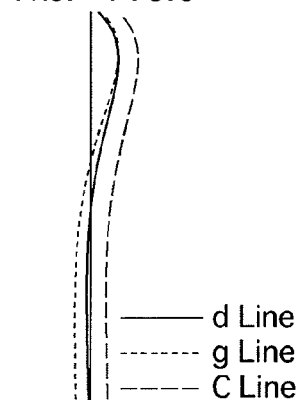
FIGS. 19A, 19B, 19C and 19D show aberrations occurred in the lens arrangement shown in FIG. 17 at an intermediate focal length, when an object at infinity is in an in-focus state.
Figure 19B:
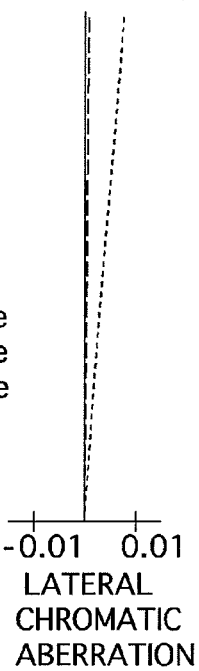
Figure 19C:
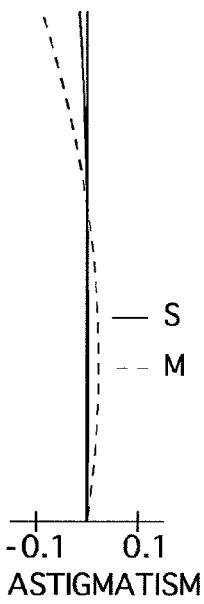
Figure 19D:
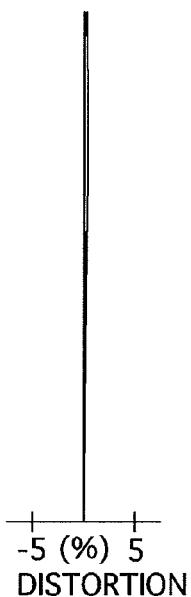
Figure 20A:
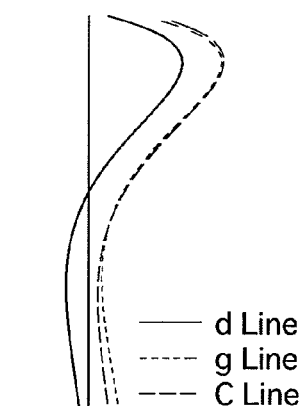
FIGS. 20A, 20B, 20C and 20D show aberrations occurred in the lens arrangement shown in FIG. 17 at the long focal length extremity, when an object at infinity is in an in-focus state.
Figure 20B:
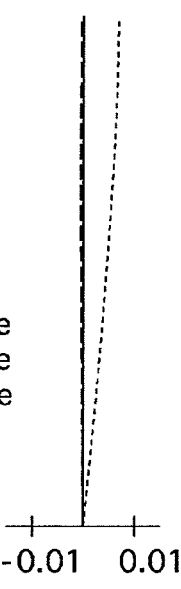
Figure 20C:
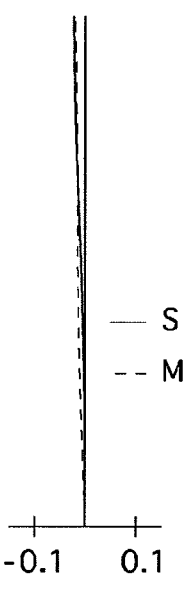
Figure 20D:
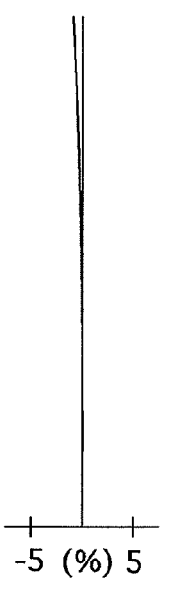

FIG. 17 shows the lens arrangement of the fifth embodiment of a zoom lens system according to the present invention. FIGS. 18A through 18D show aberrations occurred in the lens arrangement shown in FIG. 17, when an object at infinity is in an in-focus state at the short focal length extremity. FIGS. 19A through 19D show aberrations occurred in the lens arrangement shown in FIG. 17, when an object at infinity is in an in-focus state at an intermediate focal length. FIGS. 20A through 20D show aberrations occurred in the lens arrangement shown in FIG. 17, when an object at infinity is in an in-focus state at the long focal length extremity.

Table 5 shows the numerical data of the fifth embodiment.

The basic lens arrangement of the fifth embodiment is the same as that of the second embodiment.

The second lens element 12 of the negative first lens group 10 has a weak positive refractive power at the paraxial areas.

The diaphragm S is provided 0.600 in front (on the object side) of the positive second lens group 20 (surface No. 7).

TABLE 5

FNo. = 1:2.5-3.6-6.3
f = 6.54-12.60-28.13 (Zoom Ratio = 4.30)
W = 31.5-16.6-7.7

| Surf. No. | r | d | Nd | ν |
|---|---|---|---|---|
| 1 | −66.088 | 0.700 | 1.83481 | 42.7 |
| 2 | 8.067 | 0.699 | — | — |
| 3* | 11.128 | 1.000 | 1.54358 | 55.7 |
| 4* | 13.293 | 0.754 | — | — |
| 5 | 15.916 | 1.800 | 1.84666 | 23.8 |
| 6 | 130.803 | 18.941-8.042-1.301 | — | — |
| 7* | 5.841 | 1.650 | 1.69003 | 52.9 |

TABLE 5-continued

| | | | | |
|---|---|---|---|---|
| 8* | −29.793 | 0.100 | — | — |
| 9 | 8.393 | 1.752 | 1.80400 | 46.6 |
| 10 | −12.041 | 1.000 | 1.90366 | 31.3 |
| 11 | 3.633 | 3.504-10.046-23.744 | — | — |
| 12* | 90.000 | 2.000 | 1.54358 | 55.7 |
| 13* | −11.195 | 3.708-2.904-1.400 | — | — |
| 14 | ∞ | 0.500 | 1.51633 | 64.1 |
| 15 | ∞ | 0.510 | — | — |
| 16 | ∞ | 0.500 | 1.51633 | 64.1 |
| 17 | ∞ | 0.590(=fB) | | |

Aspherical surface data (the aspherical surface coefficients not indicated are zero (0.00)):

| Surf. | K | A4 | A6 |
|---|---|---|---|
| No. 3 | −0.10 | −0.28335 × 10$^{-3}$ | 0.20106 × 10$^{-4}$ |
| No. 4 | −0.10 | −0.55575 × 10$^{-3}$ | 0.17677 × 10$^{-4}$ |
| No. 7 | −0.10 | 0.16125 × 10$^{-3}$ | 0.59516 × 10$^{-5}$ |
| No. 8 | −0.10 | 0.16282 × 10$^{-3}$ | 0.67142 × 10$^{-5}$ |
| No. 12 | −0.10 | −0.28257 × 10$^{-4}$ | 0.45708 × 10$^{-4}$ |
| No. 13 | −0.10 | 0.12382 × 10$^{-3}$ | 0.44099 × 10$^{-4}$ |

| Surf. | A8 | A10 |
|---|---|---|
| No. 3 | −0.22079 × 10$^{-6}$ | |
| No. 4 | −0.22979 × 10$^{-6}$ | −0.16721 × 10$^{-8}$ |
| No. 7 | −0.27267 × 10$^{-6}$ | |
| No. 8 | −0.60815 × 10$^{-6}$ | |
| No. 12 | −0.35512 × 10$^{-5}$ | 0.88272 × 10$^{-7}$ |
| No. 13 | −0.37066 × 10$^{-5}$ | 0.91103 × 10$^{-7}$ |

The symbol * designates the aspherical surface which is rotationally symmetrical with respect to the optical axis.

The numerical values of each condition for each embodiment are shown in Table 6.

TABLE 6

| | Embod. 1 | Embod. 2 | Embod. 3 | Embod. 4 | Embod. 5 |
|---|---|---|---|---|---|
| Cond. (1) | 0.066 | −0.054 | 0.073 | 0.164 | −0.173 |
| Cond. (2) | 0.095 | −0.045 | 0.071 | 0.081 | −0.089 |
| Cond. (3) | 1.544 | 1.544 | 1.544 | 1.544 | 1.544 |
| Cond. (4) | 3.257 | 3.330 | 3.383 | 3.270 | 3.359 |
| Cond. (5) | 0.650 | 0.631 | 0.621 | 0.638 | 0.662 |
| Cond. (6) | 3.478 | 3.508 | 3.575 | 3.393 | 3.643 |
| Cond. (7) | 1.150 | 1.169 | 1.120 | 1.183 | 1.180 |
| Cond. (8) | 0.269 | 0.279 | 0.310 | 0.300 | 0.211 |
| Cond. (9) | 68.4 | 70.2 | 81.6 | 66.8 | 52.9 |

As can be understood from Table 6, the first through fifth embodiments satisfy conditions (1) through (9). Furthermore, as can be understood from the aberration diagrams, the various aberrations are suitably corrected.

According to the present invention, a negative-lead type zoom lens system of three lens groups (i.e., a negative first lens group, a positive second lens group and a positive third lens group, in this order from the object) with the following features can be attained:

aberrations are suitably corrected;

a zoom ratio exceeds 4.0; and a zooming range (focal length range) extends from a wide-angle to a telephoto angle.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a positive second lens group, and a positive third lens group, in this order from an object, wherein upon zooming from the short focal length extremity to the long focal length extremity, the distance between said negative first lens group and said positive second lens group decreases, and the distance between said positive second lens group and said positive third lens group increases;

wherein said negative first lens group comprises a negative first lens element, a positive or negative second lens element having a weaker refractive power, and a positive third lens element, in this order from the object;

wherein said zoom lens system satisfied the following condition:

$$-0.25 < f1/fp < 0.25 (f1 < 0)$$

wherein f1 designates the focal length of said negative first lens group; and fp designates the focal length of said second lens element;

wherein said positive third lens group is arranged to function as a focusing lens group, and comprises a biconvex plastic lens element having at least one aspherical surface; and wherein said zoom lens system satisfies the following conditions:

$$3.1 < f2/rs < 3.6$$

$$0.6 < f2/f3 < 1.0$$

wherein f2 designates the focal length of said positive second lens group;

rs designates a radius of curvature of the most image-side surface of said positive second lens group; and f3 designates the focal length of said positive third lens group.

2. The zoom lens system according to claim 1, wherein said second lens element of said negative first lens group satisfies the following condition:

$$-0.3 < (ra-rb)/(ra+rb) < 0.3$$

wherein ra designates a radius of curvature of the object-side surface of said second lens element of said negative first lens group; and rb designates a radius of curvature of the image-side surface of said second lens element of said negative first lens group.

3. The zoom lens system according to claim 1, wherein said second lens element of said negative first lens group comprises at least one aspherical surface, and said second lens element satisfies the following condition:

$$n2 < 1.55$$

wherein n2 designates the refractive index of the d-line of said second lens element.

4. The zoom lens system according to claim 1, wherein upon zooming from the short focal length extremity to the long focal length extremity, said positive second lens group is monotonically moved toward the object, and satisfies the following condition:

$$3.2 < m2t/m2w < 3.8$$

wherein m2t designates a magnification of said positive second lens group, at the long focal length extremity, when an object at infinity is in an in-focus state; and m2w designates a magnification of said positive second lens group, at the short focal length extremity, when an object at infinity is in an in-focus state.

5. The zoom lens system according to claim 1, wherein upon zooming from the short focal length extremity to the long focal length extremity, said positive third lens group is monotonically moved toward the image, and satisfies the following condition:

$$1.05 < m3t/m3w < 1.3$$

wherein m3t designates a magnification of said positive third lens group, at the long focal length extremity, when an object at infinity is in an in-focus state; and m3w designates a magnification of said positive third lens group, at the short focal length extremity, when an object at infinity is in an in-focus state.

6. The zoom lens system according to claim 1, wherein said negative first lens group satisfies the following condition:

$$0.2 < t1/|f1| < 0.4$$

wherein t1 designates a distance from the most object-side surface of said negative first lens group to the most image-side surface thereof; and f1 designates the focal length of said negative first lens group.

7. The zoom lens system according to claim 1, wherein the most object-side positive lens element of said positive second lens group is provided, on each surface, with an aspherical surface which is formed so that curvature becomes smaller toward the periphery, compared with a paraxial spherical surface.

8. The zoom lens system according to claim 1, wherein the most object-side lens element of said positive second lens group comprises a biconvex positive lens element, and satisfies the following condition:

$$65 < vp$$

wherein vp designates the Abbe number of said biconvex positive lens element.

9. The zoom lens system according to claim 1, wherein said second lens group comprises a positive lens element, a positive lens element, and a negative lens element, in this order from the object.

10. A zoom lens system comprises a negative first lens group, a positive second lens group, and a positive third lens group, in this order from an object, wherein upon zooming from the short focal length extremity to the long focal length extremity, the distance between said negative first lens group and said positive second lens group decreases, and the distance between said positive second lens group and said positive third lens group increases;

wherein said negative first lens group comprises a negative first lens element, a positive or negative second lens element having a weaker refractive power, and a positive third lens element, in this order from the object;

wherein said zoom lens system satisfied the following condition:

$$-0.25 < f1/fp < 0.25 (f1 < 0)$$

wherein f1 designates the focal length of said negative first lens group; and fp designates the focal length of said second lens element;

wherein upon zooming from the short focal length extremity to the long focal length extremity, said positive second lens group is monotonically moved toward the object, and satisfies the following condition:

$$3.2 < m2t/m2w < 3.8$$

wherein m2t designates a magnification of said positive second lens group, at the long focal length extremity, when an object at infinity is in an in-focus state; and m2w designates a magnification of said positive second lens group, at the short focal length extremity, when an object at infinity is in an in-focus state.

11. The zoom lens system according to claim 10, wherein said second lens element of said negative first lens group satisfies the following condition:

$$-0.3 < (ra-rb)/(ra+rb) < 0.3$$

wherein ra designates a radius of curvature of the object-side surface of said second lens element of said negative first lens group; and rb designates a radius of curvature of the image-side surface of said second lens element of said negative first lens group.

12. The zoom lens system according to claim 10, wherein said second lens element of said negative first lens group comprises at least one aspherical surface, and said second lens element satisfies the following condition:

$$n2 < 1.55$$

wherein n2 designates the refractive index of the d-line of said second lens element.

13. The zoom lens system according to claim 10, wherein upon zooming from the short focal length extremity to the long focal length extremity, said positive third lens group is monotonically moved toward the image, and satisfies the following condition:

$$1.05 < m3t/m3w < 1.3$$

wherein m3t designates a magnification of said positive third lens group, at the long focal length extremity, when an object at infinity is in an in-focus state; and m3w designates a magnification of said positive third lens group, at the short focal length extremity, when an object at infinity is in an in-focus state.

14. The zoom lens system according to claim 10, wherein said negative first lens group satisfies the following condition:

$$0.2 < t1/|f1| < 0.4$$

wherein t1 designates a distance from the most object-side surface of said negative first lens group to the most image-side surface thereof; and f1 designates the focal length of said negative first lens group.

15. The zoom lens system according to claim 10, wherein the most object-side positive lens element of said positive second lens group is provided, on each surface, with an aspherical surface which is formed so that curvature becomes smaller toward the periphery, compared with a paraxial spherical surface.

16. The zoom lens system according to claim 10, wherein the most object-side lens element of said positive second lens group comprises a biconvex positive lens element, and satisfies the following condition:

$$65 < \nu p$$

wherein $\nu p$ designates the Abbe number of said biconvex positive lens element.

17. The zoom lens system according to claim 10, wherein said second lens group comprises a positive lens element, a positive lens element, and a negative lens element, in this order from the object.

* * * * *